United States Patent [19]

Pikulski

[11] Patent Number: 5,161,207
[45] Date of Patent: Nov. 3, 1992

[54] OPTICAL FIBER CIRCUMFERENTIALY SYMMETRIC FUSION SPLICING AND PROGRESSIVE FIRE POLISHING

[75] Inventor: Joseph L. Pikulski, Westlake Village, Calif.

[73] Assignee: Hughes Aircraft Company, Los Angeles, Calif.

[21] Appl. No.: 670,665

[22] Filed: Mar. 18, 1991

[51] Int. Cl.$^5$ .............................................. G02B 6/26
[52] U.S. Cl. ................................ 385/96; 219/121.63; 219/121.78; 219/121.82; 385/98
[58] Field of Search ............... 350/96.15, 96.20, 96.21, 350/320; 65/4.1, 4.2, 4.21; 219/121.63, 121.64, 121.74, 121.75, 121.78, 121.79, 121.82; 385/95–98

[56] References Cited

U.S. PATENT DOCUMENTS

| | | | |
|---|---|---|---|
| 4,263,495 | 4/1981 | Fujita et al. | 219/121.63 X |
| 4,802,729 | 2/1989 | Rivoallan et al. | 350/96.21 |
| 4,978,201 | 12/1990 | Yamada et al. | 350/320 |
| 5,013,345 | 5/1991 | Itoh et al. | 65/4.2 |
| 5,016,971 | 5/1991 | Hsu et al. | 350/96.21 |

Primary Examiner—John D. Lee
Attorney, Agent, or Firm—C. D. Brown; R. M. Heald; W. K. Denson-Low

[57] ABSTRACT

Two optical fiber segments are spliced in an end-to-end fashion by first axially aligning the optical fiber segments, and then fusing the optical fiber segments with a converging conical light beam convergently focused to an apex region along the optical fiber. The converging conical beam heats the optical fiber segments and the splice in a circumferentially uniform manner. The apex region at which the converging conical beam is focused can be moved progressively along the length of the optical fiber to effect the fusion, and also to directionally fire polish and stress relieve the optical fiber to minimize the presence of flaws in the optical fiber after fusion is complete. The converging conical light beam is achieved by creating a diverging conical beam using movable mirrors to deflect a collimated beam into a diverging conical beam. The diverging conical beam is reflected from a parabolic mirror to form the converging conical beam that is focused toward the optical fiber. Longitudinal movement of the apex region along the optical fiber is achieved by altering the amplitude of the movement of the mirrors to change the apex angle of the diverging conical light beam.

18 Claims, 2 Drawing Sheets

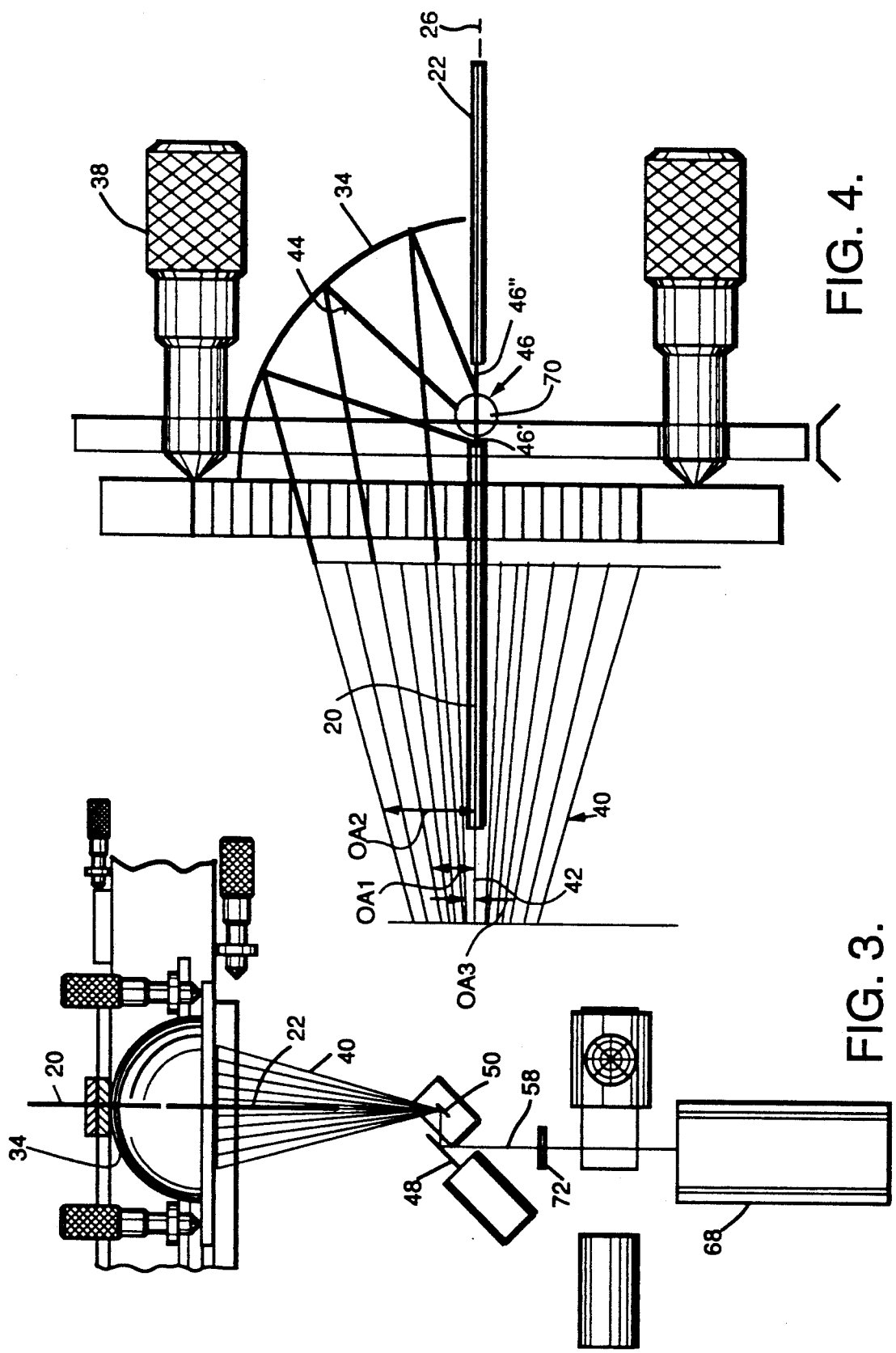

OPTICAL FIBER CIRCUMFERENTIALY SYMMETRIC FUSION SPLICING AND PROGRESSIVE FIRE POLISHING

BACKGROUND OF THE INVENTION

This invention relates to optical fibers, and, more particularly, to the fusion splicing and fire polishing of optical fiber segments to achieve a strong joint.

Glass fibers for optical information transmission are strands of glass fiber processed so that light transmitted through the fiber is subject to total internal reflection. A large fraction of the incident intensity of light directed into the glass fiber is received at the other end of the fiber, even though the glass fiber may be hundreds or thousands of meters long. The glass fibers are fabricated by preparing a preform of glasses of two different optical indices of refraction, one inside the other, and processing the preform to a fiber. The optical glass fiber is coated with a polymer layer termed a buffer to protect the glass from scratching or other damage, and the resulting coated glass fiber is generally termed an "optical fiber" in the art. As an example of its dimensions, in a typical configuration the diameter of the glass fiber is about 125 micrometers, and the diameter of the glass fiber plus the polymer buffer (the optical fiber) is about 250 micrometers (approximately 0.010 inches).

For some applications the optical fiber must be many kilometers long, and must have a high degree of optical perfection and strength over that entire length. Preparation of an optical fiber of that length having no defects is difficult. It is therefore common practice to prepare shorter optical fiber segments of acceptable quality and then splice the ends of the optical fiber segments together to achieve an optical fiber of the required length.

The splicing operation is therefore of critical importance to obtaining optical fibers of sufficient length for these applications. Current splicing procedures typically involve aligning the ends of the optical fiber segments, and fusing them by heating in an electrical arc discharge. Such techniques are generally successful in producing an end-to-end splice of acceptable optical quality. However, the longitudinal strength of the resulting spliced optical fiber is much less than that of the original unflawed optical fiber segments, with failure typically occurring at or near the splice. For example, when optical fiber segments having an axial breaking load of about 15 pounds are spliced together by conventional techniques, the resulting spliced optical fiber may have an axial breaking load of only 1-4 pounds. Since the loading to which the optical fiber may be subjected during service is determined by the lowest breaking stress along the length of the optical fiber, much of the potential strength value of the optical fiber is lost due to the presence of the weak splice.

There is an ongoing need for understanding the origin of the premature failure in the region of the splice between two optical fiber segments, and for a splicing technique that provides improved strength of the spliced region and thence the optical fiber. The present invention fulfills this need, and further provides related advantages.

SUMMARY OF THE INVENTION

The present invention provides an apparatus and procedure for splicing two optical fiber segments together in an end-to-end manner to form a spliced optical fiber. The resulting optical fiber splice has acceptable optical quality and transmission of light therethrough. The splice is also substantially stronger in tension than comparable optical fiber splices made with conventional techniques.

In accordance with the invention, apparatus for splicing together the ends of two optical fiber segments comprises means for contacting together the ends of two optical fiber segments in an end-to-end fashion and aligning the optical fiber segments along a common axis; means for fusing the optical fiber segments from an external source at their end-to-end contact to form a fused optical fiber, with substantially the same intensity of heating at all locations around the circumference of the optical fiber segments; and means for progressively fire polishing the optical fiber longitudinally along the optical fiber after fusing of the ends is complete, thereby moving defects on the surface of the optical fiber away from the fused ends.

The optical fiber segments are held in conventional adjustable holders so that they can be axially aligned by maximizing the light energy transmitted therethrough. (As used herein in relation to splicing, "optical fiber segments" are the two lengths of optical fiber that are joined together to form a single "optical fiber".)

The optical fiber segments are heated to their fusion temperature by a source that heats the end regions to be spliced through the sides of the optical fiber segments. The heating is uniform around the circumference of the optical fiber segments. The preferred approach for performing the heating is to provide a parabolic mirror whose axis is coincident with that of the aligned optical fiber segments. A diverging conical light beam whose axis coincides with that of the optical fiber segments is directed toward the mirror, which reflects the diverging conical light beam toward a focal region along the optical fiber segment axis as a converging conical light beam. This arrangement has the particular advantage that the longitudinal location of the focal region of the converging conical light beam may be moved by changing the maximum conical apex angle of the diverging conical light beam.

The diverging conical light beam, with a controllable maximum apex angle, is formed from a collimated light beam by a pair of scanning mirrors whose axes of rotation are perpendicular to each other. One of the mirrors has its axis of rotation intersecting but perpendicular to the axis of the optical fiber segments. Each of the scanning mirrors has a drive motor that causes the scanning mirror to rotate about its axis. The movement of the mirrors is controlled by a scanning generator that causes one of the scanning mirrors to rotate about its axis in a periodic fashion, as in a sine wave movement, and the other of the scanning mirrors to rotate about its axis in a similar periodic fashion but 90 degrees out of phase with the first scanning mirror. The amplitude of the rotation is selectively controllable to determine the maximum conical angle of the diverging conical light beam that results. A laser preferably provides the collimated light beam that is reflected to create the diverging conical light beam. The laser is clean, and does not introduce extraneous matter into the spliced region as is sometimes the case for plasma heating techniques.

To fuse the optical fiber segments and form the splice, the power level of the laser is increased so that the energy density in the focal region of the converging light beam is sufficiently high to heat the ends of the optical fiber segments to their fusion temperature. After fusion is complete, the energy density in the focal region is reduced by any acceptable approach. Such a reduction can be achieved by reducing the power level of the laser, by defocusing its collimated beam slightly, by increasing the scanning amplitude, or by increasing the scanned distance to dissipate the heat input per unit time over a greater linear distance of the optical fiber. The reduced energy density of the focal region is insufficient to fuse the optical fiber, but is sufficient to fire polish and stress relieve the optical fiber. The position of the focal region of the converging light beam is progressively moved longitudinally along the portion of the optical fiber from one side of the splice, past the splice, and toward the other side of the splice. This progressive movement sweeps away volatilized surface materials that are otherwise inadequately or improperly fused into the fiber surface to become flaw sites. The progressive movement of the focal region thereby both fire polishes the surface of the glass and anneals the glass to reduce internal stresses that might otherwise be present to weaken the spliced region.

The present invention has been tested and produces splices that are of optical quality equal to that of existing techniques, but are of superior strength. Other features and advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 3 is a schematic plan view of the apparatus of FIG. 1 during operation; and FIG. 4 is a schematic plan view of a detail of the apparatus of FIG. 2, illustrating the mechanism of longitudinal positioning of the focal region of the converging light beam.

DETAILED DESCRIPTION OF THE INVENTION

In accordance with a preferred embodiment of the invention, apparatus for splicing the ends of two optical fiber segments together comprises at least one adjustable optical fiber holder that adjustably holds one of the optical fiber segments adjacent its end and in a splicing position with the axes of the two segments coincident; a pair of scanning mirrors whose axes of rotation are perpendicular to each other, one of the mirrors having its axis intersecting but perpendicular to the axis of the optical fiber segments, each of the scanning mirrors having a drive motor that causes the scanning mirror to rotate about its axis; a scanning generator that causes a first one of the scanning mirrors to rotate about its axis in a periodic fashion and a second one of the scanning mirrors to rotate about its axis in a periodic fashion but out of phase with the first scanning mirror, the amplitude of the rotation being selectively controllable to form a diverging conical light beam from a collimated beam; a parabolic mirror coaxial with the axis of the aligned optical fiber segments, the parabolic mirror receiving the diverging conical beam and reflecting it inwardly to form a converging conical beam; and a laser disposed relative to the pair of scanning mirrors such that its laser beam is deflected to form the diverging conical light beam when the scanning generator drives the pair of scanning mirrors.

Figure 1:
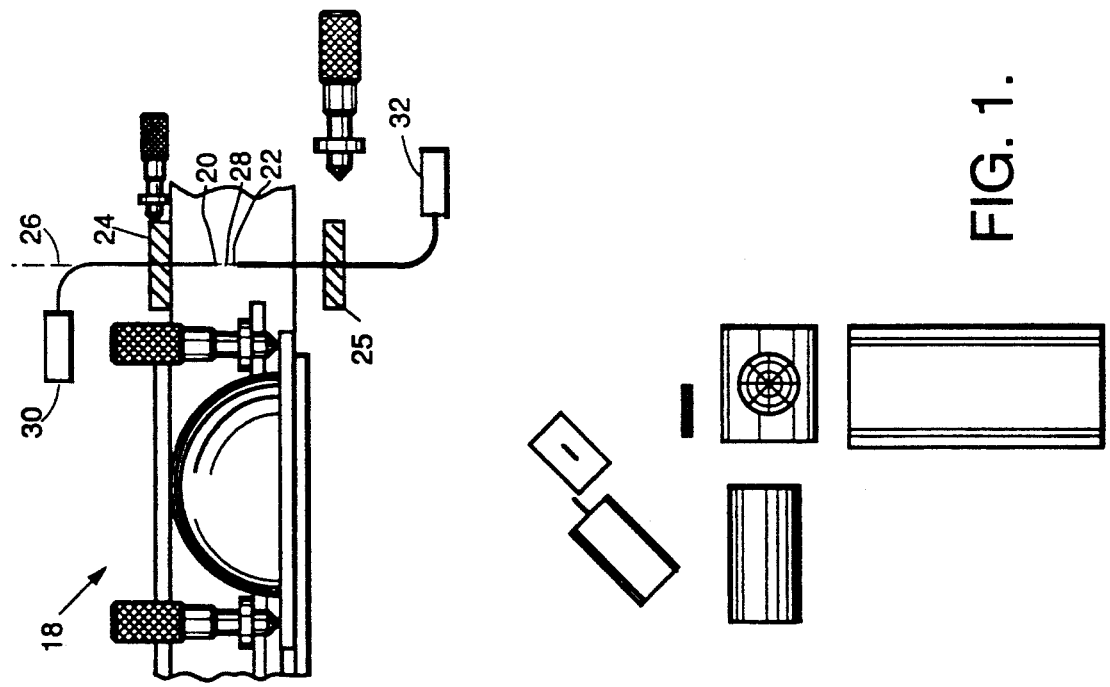
FIG. 1 is a schematic plan view of the apparatus of the invention during the initial alignment of the optical fiber segments.

An apparatus 18 for splicing optical fiber segments is illustrated in FIGS. 1-4. As depicted in FIG. 1, two optical fiber segments 20 and 22 are supported in conventional adjustable holders 24 and 25, respectively, in an end-to-end, abutting relationship. When the optical fiber segments 20 and 22 are aligned in such a fashion, they define an axis 26. The holder 24 is adjustable in three directions, to permit the optical fiber segments 20 and 22 to be moved perpendicular to the axis 26 to achieve alignment, and also parallel to the axis 26 to bring the abutting ends of the segments 20 and 22 together in a fusion zone 28. A satisfactory optical fiber holder 24 is commercially available as the Klinger MC4 Series Motor Controller and the MD4 Motor driver for the computer controlled portion of holder 24, together with a compact manual mini three-axis translator Model 466 from Newport Research, Inc. Prior to fusion, the buffer layer of the optical fiber segments 20 and 22 adjacent the ends of the segments is removed and the ends are cleaved, by conventional techniques, to define a smooth surface for splicing.

The axial alignment of the optical fiber segments 20 and 22 is achieved by conventional techniques. In the preferred approach, a light source 30 introduces light into one of the optical fiber segments 20, and a light intensity monitor 32 detects the intensity of the received light that is transmitted through the segment 20, the (as yet unfused) fusion zone 28 where misalignment may initially be present, and the segment 22. The fiber segments 20 and 22 are moved relative to each other by manipulating the holders 24 until the intensity received by the monitor 32 is a maximum, indicating the best degree of axial alignment. Satisfactory alignment devices utilizing this principle are available commercially as the FX-1000 Automated Fiber Alignment Controller.

Figure 2:
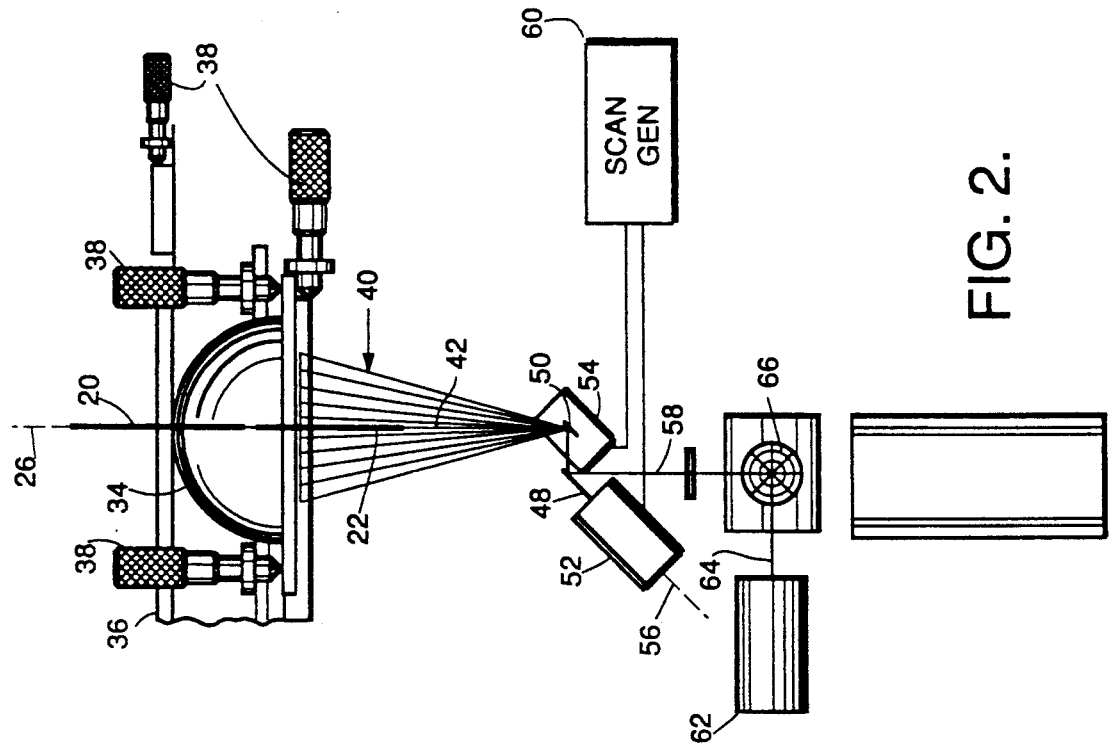
FIG. 2 is a schematic plan view of the apparatus of FIG. 1 during alignment of the optical system of the apparatus.

After the optical fiber segments 20 and 22 are aligned as shown in FIG. 1, the optical system of the apparatus 18 is aligned as shown in FIG. 2. (In FIGS. 2-4, the holders and optical fiber segment alignment structure, described in relation to FIG. 1, are not shown for the sake of clarity.) A slotted parabolic mirror 34 is adjustably supported on a sliding support block 36. During alignment of the optical fiber segments 20 and 22, the sliding support block is moved out of the way, as shown in FIG. 1. For optical system alignment and operation of the apparatus 18, the sliding support block 36 is moved into position so that the axis of the parabola of the mirror 34 is coincident with the axis 26 of the aligned optical fiber segments 20 and 22. The mirror 34 is adjustably mounted to the sliding support block 36 by micrometer adjustments 38, permitting the mirror 34 to be precisely and reproducibly adjusted to achieve optical system alignment.

The energy to fuse together the ends of the optical fiber segments 20 and 22 is supplied by a converging conical beam of light. The creation and control of that converging conical beam of light may be understood by reference to FIGS. 2-4. A diverging conical beam of light 40 whose conical axis 42 is coincident with the aligned optical fiber axis 26 is directed toward the parabolic mirror 34. The production of such a beam of light will be discussed subsequently. By a "conical beam of light" is meant a beam of light whose primary energy density falls on the surface of a cone. Some of the energy may fall inside the conical surface and some outside, but most is close to the surface of the cone. The energy density is equally distributed around the circumference of the surface of the cone, on a time averaged basis, although at any moment the energy density need not, and generally is not, the same around the circumference of the surface of the cone. A "diverging" conical beam of light has the light energy directed away from the apex of the cone, and a "converging" conical beam of light has the light energy directed toward the apex of the cone.

The diverging conical beam of light 40 is reflected by the parabolic mirror 34 as a converging conical beam of light 44, toward a focal region 46, see FIG. 4. The longitudinal position of the focal region 46 along the length of the optical fiber segments 20, 22 is determined by the included apex angle of the conical diverging beam. Thus, for example, in FIG. 4 the focal region 46 at about the location where the splice is to occur is achieved with an included angle OA1. The focal region, indicated as 46', may be moved closer to the source of the diverging conical beam 40 by increasing the included angle to OA2. The focal region, indicated as 46", may be moved farther from the source of the diverging conical beam 40 by decreasing the included angle to OA3. In each case, the light is focused over a range of locations in space rather than a precise focal spot, due to the spatial distribution of the energy in the diverging beam 40. The controllable longitudinal movement of the focal region 46 is important to fusing the ends of the optical fiber segments 20 and 22, and also in subsequent fire polishing and annealing of the spliced optical fiber.

Referring to FIG. 2, the diverging conical beam of light 40 is produced in the following manner. Two planar galvanometer mirrors 48 and 50 are mounted on rotatable axes, with the axes being rotationally driven by motors 52 and 54, respectively. In the preferred embodiment, the motors 52 and 54 are General Scanning Model G112 motors. The second mirror 50 is disposed with its axis of rotation perpendicular to but intersecting the axis 42 of the diverging conical beam 40. (In the view of FIG. 2, the axis of rotation of the second mirror 50 is perpendicular to the plane of the page.) The first mirror 48 is disposed with its axis of rotation 56 perpendicular to but not intersecting the axis of rotation of the second mirror 50. (In the view of FIG. 2, the axis of rotation of the first mirror 48 lies in the plane of the page but does not intersect the axis of rotation of the second mirror 50.) The mirrors 48 and 50 are disposed so that, with the mirrors in a centered neutral point, a collimated beam of light 58 parallel to but not collinear with the axis 42 is reflected from the first mirror 48 to the second mirror 50 and thence collinear with the axis of the diverging conical beam 42.

The motors 52 and 54 are driven in a preselected rotational pattern by a scan generator 60. The preselected pattern is preferably a sine wave, so that each motor periodically angularly oscillates in one direction from the neutral position, back to the neutral position, in the other direction from the neutral position, and back to the neutral position. The two motors 52 and 54 are driven with the same pattern, but 90 degrees out of phase with each other. The resulting locus followed by the reflection of the collimated beam 58 is complex, but is principally on the surface of a cone, thereby forming the diverging conical beam of light 40. In a preferred operating mode, the driving signal is a sine wave with a wave frequency of about 1000 Hz, although lower frequencies such as on the order of 300 Hz have also been found operable. The device of lower frequency is easier to construct mechanically with readily available equipment, and is also more reliable because less force is placed onto system components.

The apex angle DA of the diverging conical beam of light 40 is determined by the amplitude of the periodic signal produced by the scan generator 60 and supplied to the motors 52 and 54. The greater the amplitude, the greater is the apex angle DA, and the closer is the focal region 46 to the mirror 50. By controlling manually or under software control the amplitude of the periodic signal, the focal region 46 is moved longitudinally along the optical fiber segments 20 and 22.

As discussed previously, the greatest energy density is angularly distributed to be on the conical surface. Because of the oscillatory manner in which the beam is generated, the energy intensity is not the same at all points around the circumference of the conical. However, on a time averaged basis the energy distribution around the circumference of the diverging cone is uniform. Consequently, the energy distribution around the circumference of the converging conical beam 44 is uniform, and the heating of the optical fiber segments 20 and 22 in the focal region 46 is circumferentially uniform, in a time-averaged sense. The uniform heating of the optical fiber segments 20 and 22 contributed to the formation of a strong, low-stress splice.

To attain precise control over the location of the focal region 46 and to achieve uniform circumferential heating of the optical fiber segments 20 and 22, the apparatus 18 must be accurately aligned. FIG. 2 shows the optical alignment configuration. Alignment is facilitated by supplying the collimated beam 58 using a low-power helium-neon laser 62. An output beam 64 of the low power laser 62 is reflected from a removable planar mirror 66 to be collinear and coincident with, and to form the collimated beam 58. With this beam 58 operating, the apparatus 58 can be safely aligned, while otherwise in operation with the mirrors 48 and 50 forming the diverging conical beam 42, by manipulating the various adjustments to the optical system discussed previously.

Once alignment is achieved, the mirror 66 is removed, and the collimated beam 58 is produced by a high-power $CO_2$ laser 68, as illustrated in FIG. 3. The laser 68 is used during both fusion of the optical fiber segments 20 and 22, and subsequent fire polishing and annealing of the spliced optical fiber.

Glass does not melt at a fixed temperature, but instead softens and flows over a range of temperatures. The term "fusion" as used herein means to heat the ends and adjacent portions of the optical fiber segments 20 and 22 to a sufficiently high temperature that, under a small amount of longitudinal compressive force introduced by relative inward movement of the holders 24 and 25, the two optical fiber segments 20 and 22 soften and flow together to form a single spliced optical fiber with a spliced region 70 (FIG. 4) therebetween. A relatively high power level of the laser 68 is required to achieve fusion. In a working model of the apparatus 18, the $CO_2$ laser 68 was a readily available unit with a 5.5 watt output power. However, this power level was found to vaporize the glass in the concentrated focal region 46. The power density of the beam reaching the focal region 46 was therefore reduced by inserting a power diffuser 72 into the conical beam just after the beam was reflected from the mirror 50. Two different types of power diffusers 72 were tried and found operable. One type of power diffuser 72 was a germanium defocusing lens that broadened the focal region 46 and resulted in fiber fusion in about ¼ second. The other type of power diffuser 72 was a 33% transmission germanium/silicon neutral density filter that reduced the intensity of the laser beam and also resulted in fiber fusion in about ¼ second. The power diffuser 72 would not be required if a smaller laser 68 were used.

After the fusion of the optical fiber segments 20 and 22 has occurred, there may be defects in the spliced optical fiber that can reduce its strength significantly. Glass is a brittle material whose breaking strength is strongly influenced by the presence of even small imperfections. Slight surface irregularities or even residual stress concentrations produced as the optical fiber cools can drastically reduce its strength in the spliced region. The use of laser heating removes one source of imperfections found in optical fibers spliced by plasma arc techniques, minute amounts of ejected electrode material that become embedded in the surface of the optical fiber and serve as failure sites. The apparatus 18 is operated in a clean environment/gas envelope provided by a Matheson Gas Filter Model 205 which removes all particulate material from an in-house supply line of argon gas that was used to provide a controlled atmosphere in the region of the splice. Alternatively, filtered oxygen and nitrogen have been used to provide the gas envelope.

There are, however, other imperfections that result from the act of heating and fusing, and cannot be avoided entirely. Residual stresses are one such imperfection. Another is minute particles of glass that are ejected from the surface of the optical fiber as it fuses and which can redeposit on the surface of the optical fiber as "silica blooms". These and other fusion-related imperfections can cause a significant reduction in optical fiber strength.

According to the present invention, the optical fiber is fire polished and annealed in, and longitudinally adjacent to, the splice 70. The fire polishing is conducted in a progressive manner by moving the annealing heat source along the length of the optical fiber in a sweeping movement that tends to remove the imperfections from the neighborhood of the splice 70. The fire polishing is accomplished by reducing the power level of the converging beam of light 44, preferably either by reducing the power density of the laser beam in the focal region 46 by one of the techniques previously discussed. The diverging angle is then adjusted by varying the amplitude of the mirror driving signal so that the focal region 46 is on the optical fiber but spaced apart from the splice 70 in one direction or the other. The amplitude of the mirror driving signal is then changed to sweep the focal region 46 toward the splice 70, through the region of the splice 70, and well past the splice 70. This sweeping action may be repeated several times, preferably in the same direction each time. This progressive sweeping tends to move silicon bloom and other physical imperfections well away from the splice 70. It has been found that redeposition of such removed material too near the splice 70 can lead to a reduction in strength of the splice 70. It is preferred to scan the focal region 46 from at least about 1-½ millimeters from one side of the splice 70, through the splice 70, and to about 1-½ millimeters on the other side of the splice 70.

A preferred splicing apparatus 18 as described herein was constructed and used to splice a number of optical fibers. Post-splicing strengths of 4-¼ and 5-¼ pounds were achieved, after careful system alignment but with manual control of fire polishing. Even better results are expected after fully automated fire polishing is introduced. Commercial splicing apparatus that uses electrical plasma heating typically reaches splice strengths of only 1–2 pounds.

Although particular embodiments of the invention have been described in detail for purposes of illustration, various modifications may be made without departing from the spirit and scope of the invention. Accordingly, the invention is not to be limited except as by the appended claims.

What is claimed is:

1. Apparatus for splicing together the ends of two optical fiber segments, comprising:
   means for contacting together the ends of two optical fiber segments in an end-to-end fashion and aligning the optical fiber segments along a common axis;
   means for fusing the optical fiber segments from an external source at their end-to-end contact to form a fused optical fiber, with substantially the same intensity of heating at all locations around the circumfernce of the optical fiber segments; and
   means for progressively fire polishing the optical fiber longitudinally along the optical fiber after fusing of the ends is complete, thereby moving defects on the surface of the optical fiber away from the fused ends.

2. The apparatus of claim 1, wherein the means for fusing includes
   a parabolic mirror whose axis is coincident with that of the aligned optical fiber segments.

3. The apparatus of claim 2, wherein the means for fusing includes
   means for directing a diverging conical light beam toward the parabolic mirror.

4. The apparatus of claim 3, wherein the means for fire polishing includes means for controllably selecting the maximum apex angle of the diverging cone.

5. The apparatus of claim 3, wherein the means for directing includes
   a pair of scanning mirrors whose axes of rotation are perpendicular to each other, one of the mirrors having its axis intersecting but perpendicular to the axis of the optical fiber segments, each of the scanning mirrors having a drive motor that causes the scanning mirror to rotate about its axis, and
   a scanning generator that causes a first one of the scanning mirrors to rotate about its axis in a periodic fashion and a second one of the scanning mirrors to rotate about its axis in a periodic fashion but out of phase with the first scanning mirror, the amplitude of the rotation being selectively controllable to form a diverging conical light beam.

6. The apparatus of claim 1, wherein the means for fusing includes a laser.

7. The apparatus of claim 1, wherein the means for contacting includes
   at least one optical fiber holder that adjustably holds one of the optical fiber segments so that it may be aligned with the other optical fiber segment in an end-to-end manner.

8. Apparatus for splicing the ends of two optical fiber segments together, comprising:
   at least one adjustable optical fiber holder that adjustably holds one of the optical fiber segments adjacent its end;

means for forming a converging conical light beam from a collimated light beam, the converging conical light beam being directed inwardly toward an apex focal region at the ends of the optical fiber segments where the segments are to be spliced together and being further directed so as to substantially uniformly heat all locations around the circumference of the optical fiber segments;

means for progressively moving the focal region longitudinally along the length of the optical fiber segments; and a light source that provides the collimated beam of light.

9. The apparatus of claim 8, wherein the means for forming includes a pair of scanning mirrors whose axes of rotation are perpendicular to each other, one of the mirrors having its axis intersecting but perpendicular to the axis of the optical fiber segments, each of the scanning mirrors having a drive motor that causes the scanning mirror to rotate about its axis, and a scanning generator that causes a first one of the scanning mirrors to rotate about its axis in a periodic fashion and a second one of the scanning mirrors to rotate about its axis in a periodic fashion but out of phase with the first scanning mirror.

10. The apparatus of claim 9, wherein the means for progressively moving includes means for varying the amplitude of the rotation of the scanning mirrors to form a diverging conical light beam.

11. The apparatus of claim 8, wherein the light source is a laser.

12. The apparatus of claim 8, further including means for optically aligning the optical fiber segments and the means for forming.

13. The apparatus of claim 12, wherein the means for optically aligning includes a light source that directs a beam of light into one of the optical fiber segments at a location remote from the location where it is to be spliced, and a light detector that receives a beam of light from the other of the optical fiber segments at a location remote from the location where it is to be spliced.

14. Apparatus for splicing the ends of two optical fiber segments together, comprising:

at least one adjustable optical fiber holder that adjustably holds one of the optical fiber segments adjacent its end and in a splicing position with the axes of the two segments coincident;

a pair of scanning mirrors whose axes of rotation are perpendicular to each other, one of the mirrors having its axis intersecting but perpendicular to the axis of the optical fiber segments, each of the scanning mirrors having a drive motor that causes the scanning mirror to rotate about its axis;

a scanning generator that causes a first one of the scanning mirrors to rotate about its axis in a periodic fashion and a second one of the scanning mirrors to rotate about its axis in a periodic fashion but out of phase with the first scanning mirror, the amplitude of the rotation being selectively controllable to form a diverging conical light beam from a collimated beam;

a parabolic mirror coaxial with the axis of the aligned optical fiber segments, the parabolic mirror receiving the diverging conical beam and reflecting it inwardly to form a converging conical beam; and a laser disposed relative to the pair of scanning mirrors such that its laser beam is deflected to form the diverging conical light beam when the scanning generator drives the pair of scanning mirrors.

15. The apparatus of claim 14, further including a light source that directs a beam of light into one of the optical fiber segments at a location remote from the location where it is to be spliced, and a light detector that receives a beam of light from the other of the optical fiber segments at a location remote from the location where it is to be spliced.

16. The apparatus of claim 14, further including a beam intensity diffuser in the path of the laser beam, the intensity diffuser reducing intensity of the converging conical beam.

17. A process for joining the ends of two optical fiber segments, comprising the steps of:

aligning two optical fiber segments in an end-to-end manner with the optical fiber segments lying along an axis;

forming a converging conical light beam whose conical axis coincides with the axis of the aligned optical fiber segments and whose focal region lies on the axis of the aligned optical fiber segments; and providing a sufficient power level to the light beam to fuse and splice the aligned ends of the optical fiber segments.

18. The process of claim 17, further including the additional steps, after the step of providing, of reducing the power density of the converging conical light beam in its focal region; and fire polishing the surface of the fused optical fiber by progressively moving the focal region of the converging conical light beam longitudinally along the optical fiber from one side of the splice, through the splice, and toward the other side of the splice.

* * * * *